United States Patent [19]

Tokunaga et al.

[11] Patent Number: 4,656,088
[45] Date of Patent: Apr. 7, 1987

[54] MAGNETIC RECORDING MEDIUM

[75] Inventors: Fumihiro Tokunaga; Takamitsu Asai; Masaaki Fujiyama, all of Kanagawa, Japan

[73] Assignee: Fuji Photo Film Co., Ltd., Kanagawa, Japan

[21] Appl. No.: 768,608

[22] Filed: Aug. 23, 1985

[30] Foreign Application Priority Data

Aug. 23, 1984 [JP] Japan .................. 59-175531

[51] Int. Cl.$^4$ .................................. G11B 5/708
[52] U.S. Cl. .................. 428/323; 252/62.54; 427/128; 427/131; 428/328; 428/329; 428/330; 428/694; 428/900
[58] Field of Search ............ 428/694, 695, 900, 403, 428/328, 329, 323, 330; 427/128, 131; 252/62.54; 360/134–136

[56] References Cited

U.S. PATENT DOCUMENTS

| | | | |
|---|---|---|---|
| 3,630,910 | 12/1971 | Akashi | 428/900 |
| 4,117,190 | 9/1978 | Akashi | 428/323 |
| 4,420,408 | 12/1983 | Kajimoto | 428/329 |
| 4,442,171 | 4/1984 | Sato | 428/336 |
| 4,572,866 | 2/1986 | Nakamura | 428/694 |

FOREIGN PATENT DOCUMENTS 0167115 8/1985 Japan .................. 428/329

*Primary Examiner*—Ellis P. Robinson
*Attorney, Agent, or Firm*—Sughrue, Mion, Zinn, Macpeak and Seas

[57] ABSTRACT

A magnetic recording medium is disclosed. The medium comprises a non-magnetic support having provided thereon a magnetic layer comprising a binder, a magnetic powder and a powder of an oxide represented by the formula:

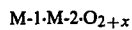

$$M\text{-}1 \cdot M\text{-}2 \cdot O_{2+x}$$

wherein M-1 is at least one of barium, strontium, lead and calcium; M-2 is at least one member of titanium, zirconium and tin; and x represents a number of from 0 to 0.9. The medium has a high S/N ratio and improved wear resistance and causes only moderate wear of a magnetic head.

16 Claims, No Drawings

MAGNETIC RECORDING MEDIUM

FIELD OF THE INVENTION

This invention relates to a magnetic recording medium and, more particularly, to a magnetic recording medium having a high S/N ratio and improved wear resistance and causes only moderate wear of a magnetic head.

BACKGROUND OF THE INVENTION

Magnetic recording media for video or audio devices or computers are required to have excellent wear resistance since they are vigorously rubbed against a magnetic head for reproduction of recorded signals. This causes wear of the magnetic coating layer. It is also required to impart electric conductivity to the magnetic layer in order to prevent adhesion of dust in air due to static charge.

These requirements have hitherto been fulfilled by incorporating non-magnetic powders that are harder than magnetic powders, such as chromic oxide powders ($Cr_2O_3$) and aluminum oxide powders ($Al_2O_3$), and carbon black to the magnetic coating layer as disclosed in, e.g., Japanese Patent Publication Nos. 39402/74, 18561/77, U.S. Pat. No. 3,833,412, etc.

With the recent remarkable improvement in recording density and S/N ratio, magnetic substances used in the magnetic recording medium have been made finer. Under such circumstances, the above-described combination of chromic oxide powders, aluminum oxide powders, etc. and carbon black cannot sufficiently cope with the development of high-density recording or high S/N ratio, even though they are effective on wear resistance and abrasion of a magnetic head.

SUMMARY OF THE INVENTION

In order to eliminate the above-described disadvantages and to obtain a magnetic recording medium of high S/N ratio having excellent wear resistance and which causes only moderate wear of a magnetic head, the present inventors have conducted extensive studies on various inorganic powders. As a result, it has now been found that a specific metal oxide powder is extremely effective, and the present invention has been completed based on this finding.

Accordingly, an object of the this invention is to provide a magnetic recording medium having a high S/N ratio.

Another object of this invention is to provide a magnetic recording medium having excellent wear resistance.

A further object of this invention is to provide a magnetic recording medium by which a moderate amount of a magnetic head is worn out.

These objects can be accomplished by a magnetic recording medium comprising a non-magnetic support having provided thereon a magnetic layer comprising a binder and a magnetic powder, wherein said magnetic layer comprising as an additional component a powder of an oxide represented by the formula:

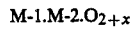

$$M\text{-}1.M\text{-}2.O_{2+x}$$

wherein M-1 represents at least one member selected from the group consisting of barium, strontium, lead and calcium; M-2 represents at least one member selected from the group consisting of titanium, zirconium and tin; and x represents a number satisfying the formula $0 \leq x \leq 0.9$.

DETAILED DESCRIPTION OF THE INVENTION

In the above-described formula for the oxide powder of the present invention, the number x preferably ranges from 0 to 0.7, and more preferably from 0 to 0.5.

The oxide powder according to the present invention may include a solid solution wherein M-1 or M-2 in the above-described formula represents two or more members. Such a solid solution includes those represented by the formulae: $(Ba_bPb_b)TiO_{2+x}$ (wherein $0<b<1$), $Sr(Ti_cZr_{1-c})O_{2+x}$ (wherein $0<c<1$), and the like.

These oxide powders exhibit electric conductivity, satisfactory dispersibility as compared with carbon black, and moderate hardness. Therefore, they are capable of imparting moderate head wearability to a magnetic layer. A preferred amount of head wear ranges from 2 to 10 μm/100 hr, and more preferably from 4 to 6 μm/100 hr. If the head wear is less than 2 μm/100 hr, the head readily undergoes obstruction. With a head wear of more than 10 μm/100 hr, the head does not withstand use due to excessive wear.

Further, since the oxide powders of the present invention can substitute for chromic oxide powders or aluminum oxide powders that have conventionally been used as abrasives, or for carbon black that has conventionally been used as an antistatic agent or solid lubricant, it is possible to greatly reduce the amounts of powders other than magnetic powders to be added to a magnetic layer. As a result, the packing density of the magnetic powders can be increased to thereby achieve high-density recording and a high S/N ratio. In cases where the oxide powder of the present invention is incorporated into a magnetic layer having a multi-layer structure, it is most effective to add it to the uppermost layer.

The oxide powder according to the present invention can be obtained, for example, by reducing fine powders of barium metatitanate ($BaTiO_3$) in a hydrogen stream at 800° C. for 2 hours. The process for preparing $BaTiO_3$, etc. is described in Kiyoshi Okazaki, *Ceramic Yudotai Kagaku*, 37, Gakukensha and is well known in the art.

An average particle size of the oxide powder which can be used in the present invention is preferably not more than 0.5 μm, and more preferably of from 0.03 to 0.3 μm.

When two kinds of the oxide powders having different average particle sizes are used in combination, improvement of electric conductivity and durability can further be ensured. For example, a combined use of fine powders having an average particle size of from 0.03 to 0.09 μm, and coarse powders having an average particle size of from 0.1 to 0.5 μm brings about an increased packing effect, which leads to improved electric conductivity.

The oxide powder according to the present invention is usually used in an amount of from 0.1 to 20 parts by weight, preferably of from 0.2 to 17 parts by weight, and more preferably of from 0.5 to 15 parts by weight, per 100 parts by weight of the magnetic powder.

The magnetic powders which can be used in the present invention include ordinary $\gamma$-$Fe_2O_3$, chromium dioxide powders ($CrO_2$), Co-containing magnetic iron oxide powders having a specific surface area ($S_{BET}$ as determined according to a BET equation) of not less than 28 m²/g, magnetic metal powders having a specific surface area ($S_{BET}$) of not less than 20 m²/g, hexagonal ferrite magnetic powders having a longer diameter of not less than 0.35 μm, and the like.

The hexagonal ferrite magnetic powders include, for example, substituted ferrites of barium ferrite, strontium ferrite, lead ferrite or calcium ferrite, Mn-Bi compounds and cobalt alloys of the hexagonal crystal system. Of these, Co-substituted compounds of barium ferrite or strontium ferrite are particularly preferred.

The hexagonal ferrite magnetic powders have a longer diameter of from 0.01 to 0.3 μm, and preferably of from 0.03 to 0.2 μm, and a thickness of not more than 0.3 μm, and preferably of from 0.003 to 0.1 μm.

The acicular ratio (diameter/thickness ratio) of the magnetic metal powders is 1 or more, and preferably from 2 to 10.

The effect of the present invention is particularly conspicuous when magnetic metal powders having a specific surface area ($S_{BET}$) of not less than 20 m²/g and a saturation magnetization ($\sigma s$) of not more than 140 emu/g, and preferably not more than 130 emu/g, are employed.

The magnetic metal powders have a metal content of not less than 75% by weight, and preferably not less than 80% by weight, with the metal content being alloy powders containing not less than 50% by weight of Fe and other elements selected from Co, Ni, Cr, Zn, Al, Mn, etc.

Binders which can be used in the present invention can be selected from conventionally known thermoplastic resins, thermosetting resins, reactive resins and mixtures thereof.

The thermoplastic resins to be used have a softening point of 150° C. or lower, an average molecular weight of about 10,000 to about 200,000 and a degree of polymerization of about 200 to about 2,000. Examples of such thermoplastic resins are vinyl chloride/vinyl acetate copolymers, vinyl chloride/vinylidene chloride copolymers, vinyl chloride/acrylonitrile copolymers, acrylic ester/acrylonitrile copolymers, acrylic ester/vinylidene chloride copolymers, acrylic ester/styrene copolymers, methacrylic ester/acrylonitrile copolymers, methacrylic ester/vinylidene chloride copolymers, methacrylic ester/styrene copolymers, urethane elastomers, polyvinyl fluoride, vinylidene chloride/acrylonitrile copolymers, butadiene/acrylonitrile copolymers, polyamide resins, polyvinyl butyral, cellulose derivatives (e.g., cellulose acetate butyrate, cellulose diacetate, cellulose triacetate, cellulose propionate, nitrocellulose, etc.), styrene/butadiene copolymers, polyester resins, various synthetic rubber type thermoplastic resins (e.g., polybutadiene, polychloroprene, polyisoprene, styrene/butadiene copolymers, etc.), and mixtures thereof.

The thermosetting resins or reactive resins to be used have a molecular weight of less than 200,000 in the state of a coating composition, but increase their molecular weight infinitely after reactions, such as condensation, addition, and the like. Preferred thermosetting resins or reactive resins are those which do not soften or melt until they are decomposed with heat. Specific examples of such resins include phenol-formalin novolak resins, phenol-formalin resol resins, phenol-furfural resins, xylene-formaldehyde resins, urea resins, phenolic resin modified alkyd resins, maleic acid modified alkyd resins, unsaturated polyester resins, epoxy resins plus a hardening agent (e.g., polyamines, acid anhydrides or polyamide resins), isocyanate-terminated moisture hardenable polyester resins, isocyanate-terminated moisture hrdenable polyether resins, polyisocyanate prepolymers (compounds having at least 3 isocyanate groups per molecule that are produced by reacting diisocyanate with low-molecular weight triols, as well as diisocyanate trimers or tetramers), polyisocyanate prepolymers and the resins having active hydrogen (e.g., polyester polyols, polyether polyols, acrylic acid copolymers, maleic acid copolymers, 2-hydroxyethyl methacrylate copolymers, and p-hydroxystyrene copolymers), and mixtures thereof.

These binders may be used individually or in combination thereof. The binder is mixed with the magnetic powders in an amount of from 8 to 400 parts by weight, and preferably from 10 to 200 parts by weight, per 100 parts by weight of the magnetic powders.

The magnetic recording layer can further contain appropriate additives, such as a dispersing agent, a lubricant, and the like.

Examples of applicable dispersing agents are disclosed in U.S. Pat. No. 4,135,016. These dispersing agents are used in an amount of from 0.3 to 30 parts by weight, preferably from 0.5 to 10 parts by weight per 100 parts by weight of the magnetic powders.

Examples of applicable lubricants are general fatty acids, fatty acid esters, silicone type lubricants, sorbitan type surface active agents, and the like. The preferred are fatty acids having 10 or more carbon atoms and esters thereof, and the more preferred are oleic acid, lauric acid, myristic acid, palmitic acid, stearic acid and behenoic acid and esters thereof. These lubricants are used in an amount of from 0.3 to 30 parts by weight, preferably from 0.5 to 10 parts by weight per 100 parts by weight of the magnetic powders.

The magnetic recording medium of the present invention can be prepared according to the method disclosed in U.S. Pat. No. 4,135,016.

The present invention will now be described in greater detail with reference to the following examples which are given here for illustrative purposes only and are by no means intended to limit the scope of the invention. In the Examples, all parts are by weight.

EXAMPLE 1

A magnetic solution having the following formulation was coated on a 13 μm thick polyethylene terephthalate film.

Magnetic Solution Formulation

Co-containing barium ferrite (average particle size: 0.08 μm; averrage particle thickness: 0.02 μm; $S_{BET}$: 23 m²/g): 100 parts Maleic acid-containing vinyl chloride/vinyl acetate copolymer (vinyl/chloride/vinyl acetate/maleic anhydride: 86/13/1; average molecular weight: 28,000): 9 parts Polyurethane resin (consisting of butylene adipate and tolylene diisocynate; average molecular weight: 20,000): 10 parts Polyisocyanate ("Coronate L", produced by Nippon Polyurethane Co., Ltd.; molecular weight: 656): 10 parts Amyl stearate: 0.6 part Carbon black (average particle size: 120 μm): see Table 1

Aluminum oxide powder (Al$_2$O$_3$) (average particle size: 0.35 μm): see Table 1
Barium titanate (BaTiO$_2$) (average particle size: 0.1 μm): see Table 1
Methyl ethyl ketone 80 parts
Toluene 80 parts The coated layer was dried and smoothened with a mirror roll to form a magnetic layer having a thickness of 4 μm. The resulting magnetic medium was slit into ½ inch width to prepare a magnetic tape and evaluated for various performance properties. The results obtained are shown in Table 1. The evaluation was conducted in accordance with the following methods.

(1) Initial Color S/N Ratio:

Determination was carried out using a noisemeter "925-C" (manufactured by Shibasoku Co., Ltd.) with a high pass filter of 10 kHz and a low pass filter of 500 kHz (A.M.). A video tape recorder "NV-8300" (manufactured by Matsushita Electric Industries Co., Ltd.) was used. The voltage ratio was expressed taking that of Sample 1 in each table as 0 dB.

(2) Head Wear:

The sample was run on a VHS type video tape recorder (NV-8300) with a new magnetic head for 100 hours, and the wear of the head (unit: μm) was measured.

(3) Still Life:

The still life (durability at still mode) was determined by recording predetermined video signals on a VHS type tape recorder (NV-8300), and measuring the period of time until ⅓ of the reproduced still image disappeared under a back tension of 50 g.

The above-described measurements (1) to (3) were measured at 23° C. and 70% RH.

TABLE 1

| Sample No. | Amount of Powder Added | | | Initial Color S/N Ratio (dB) | Head Wear (μm/100 hr) | Still Life (min) | Surface Electric Resistance (Ω/sq.) |
|---|---|---|---|---|---|---|---|
| | BaTiO$_2$ (part)* | Carbon Black (part)* | Al$_2$O$_3$ (part)* | | | | |
| 1 | — | 2 | 2 | 0 | 1.0 | =120 | 4 × 10$^8$ |
| 2 | — | 2 | — | +1.7 | 0.5 | 5 | 3 × 10$^8$ |
| 3 | — | 1 | 2 | +0.3 | 1.5 | ≦120 | 8 × 10$^8$ |
| 4 | 1 | 2 | — | +2.4 | 4.2 | ≦120 | 5 × 10$^8$ |
| 5 | 2 | — | — | +2.5 | 6.0 | ≦120 | 5 × 10$^8$ |

Note:
*part by weight per 100 parts by weight of magnetic powder

EXAMPLE 2

A magnetic solution of the following formulation was coated on a 15 μm thick polyethylene terephthalate film and dried, followied by smoothing treatment with a mirror roll to obtain a magnetic layer having a thickness of 5 μm.

Magnetic Solution Formulation

Co-containing iron oxide S$_{BET}$: 30 m$^2$/g): 100 parts
Vinyl chloride/vinyl acetate copolymer (87/13; average molecular weight: 28,000): 12 parts
Polyurethane resin (consisting of butylene adipate and tolylene diisocyanate; average molecular weight: 20,000): 15 parts
Polyisocynate ("Coronate L", produced by Nippon Polyurethane Co., Ltd.; molecular weight: 656): 12 parts
Stearic Acid: 1 part
Butyl stearate: 1 part
Carbon black (average particle size: 120 μm): see Table 2
Aluminum oxide powder (Al$_2$O$_3$) (average particle size: 0.35 μm): see Table 2
Strontium titanate powder (SrTiO$_{2.1}$) (average particle size: 0.1 μm): see Table 2
Methyl ethyl ketone: 300 parts The resulting magnetic medium was slit into a ½ inch width to prepare a magnetic tape. The magnetic tape was evaluated for the properties in the same manner as described in Example 1, and the results are shown in Table 2.

TABLE 2

| Sample No. | Amount of Powder Added | | | Initial Color S/N Ratio (dB) | Head Wear (μm/100 hr) | Still Life (min) | Surface Electric Resistance (Ω/sq.) |
|---|---|---|---|---|---|---|---|
| | SrTiO$_{2.1}$ (part)* | Carbon Black (part)* | Al$_2$O$_3$ (part)* | | | | |
| 1 | — | 2 | 2 | 0 | 1.5 | ≦120 | 6 × 10$^8$ |
| 2 | — | 2 | — | +1.6 | 0.7 | 10 | 4 × 10$^8$ |
| 3 | — | 1 | 2 | +0.4 | 1.4 | ≦120 | 9 × 10$^8$ |
| 4 | 1 | 2 | — | +2.2 | 4.5 | ≦120 | 5 × 10$^8$ |
| 5 | 1 | — | — | +2.4 | 5.5 | ≦120 | 7 × 10$^8$ |

Note:
*part by weight per 100 parts by weight of magnetic powder

EXAMPLE 3

A magnetic solution of the following formulation was coated on a 10 μm thick polyethylene terephthalate film, dried and subjected to smoothening treatment with a mirror roll to obtain a magnetic layer having a thickness of 3.5 μm.

Magnetic Solution Formulation

Ferromagnetic metal powder (Fe-Ni alloy; Ni content: ca. 5 wt%; S$_{BET}$: 55 m$^2$/g; σs: 125 emu/g): 100 parts
Vinyl chloride/vinylidene acetate copolymer (80/20; average molecular weight: 35,000): 11 parts
Polyurethane resin (consisting of butylene adipate and tolylene diisocyanate; average molecular weight: 20,000): 11 parts
Polyisocynate ("Coronate L", produced by Nippon Polyurethane Co., Ltd.; molecular weight: 656): 8 parts
Stearic Acid: 1 part
Oleic acid: 1 part
Butyl stearate: 1 part Carbon black (average particle size: 40 μm): see Table 3
Chromic oxide powder ($Cr_2O_3$) (average particle size: 0.35 μm): see Table 3
Barium zirconate powder ($BaZrO_{2.0}$) (average particle size: 0.1 μm): see Table 3
Methyl ethyl ketone: 500 parts The resulting magnetic medium was slit into a ½ inch width and evaluated for the properties in the same manner as in Example 1. The results obtained are shown in Table 3.

TABLE 3

| Sample No. | Amount of Powder Added | | | Initial Color S/N Ratio (dB) | Head Wear (μm/100 hr) | Still Life (min) | Surface Electric Resistance (Ω/sq.) |
|---|---|---|---|---|---|---|---|
| | $BaZrO_2$ (part)* | Carbon Black (part)* | $Cr_2O_3$ (part)* | | | | |
| 1 | — | 1.5 | 1.5 | 0 | 0.2 | ≦120 | $3 \times 10^8$ |
| 2 | — | 1.5 | — | +1.5 | 0.1 | 5 | $2 \times 10^8$ |
| 3 | — | 0.75 | 1.5 | +0.3 | 0.2 | ≦120 | $5 \times 10^8$ |
| 4 | 0.75 | 1.5 | — | +2.2 | 4.3 | ≦120 | $1 \times 10^8$ |
| 5 | 1.5 | — | — | +2.5 | 5.6 | ≦120 | $2 \times 10^8$ |

Note:
*part by weight per 100 parts by weight of magnetic powder

According to the above results, if the magnetic oxide powders of the present invention are used in the magnetic layer of the magnetic recording medium, the magnetic recording medium has a high S/N ratio and excellent wear resistance and by which a moderate amount of a magnetic head is worn out.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising a nonmagnetic support having provided thereon a magnetic layer comprising a binder and a magnetic powder, wherein said magnetic layer comprises as an additional component powder of an oxide represented by the formula:

$$M\text{-}1 \cdot M\text{-}2 \cdot O_{2+x}$$

wherein M-1 represents at least one member selected from the group consisting of barium, strontium, lead and calcium; M-2 represents at least one member selected from the group consisting of titanium, zirconium and tin; aand x represents a number satisfying the formula $0 \leq x \leq 0.9$, the powder has an average particle size of not more than 0.5 μm, the powder is present in an amount of from 0.1 to 20 parts by weight per 100 parts by weight of the magnetic powder and the powder exhibits electrical conductivity, has satisfactory disperibility, has moderate hardness and is capable of imparting moderate head wearability to a magnetic layer.

2. The magnetic recording medium as in claim 1, wherein x represents a number satisfying the formula $0 \leq x \leq 0.7$.

3. The magnetic recording medium as in claim 2, wherein x represents a number satisfying the formula $0 \leq x \leq 0.5$.

4. The magnetic recording medium as in claim 1, wherein the powder is strontium titanate powder.

5. The magnetic recording medium as in claim 1, wherein the powder has an average particle size of from 0.03 to 0.3 μm.

6. The magnetic recording medium as in claim 1, wherein the powder is a mixture of powders having different average particle sizes.

7. The magnetic recording medium as in claim 6, wherein the powder comprises a powder having an average particle size of from 0.03 to 0.09 μm and a powder having an average particle size of from 0.1 to 0.5 μm.

8. The magnetic recording medium as in claim 1, wherein the powder is barium zirconate powder.

9. The magnetic recording medium as in claim 7, wherein the powder is present in an amount of from 0.2 to 17 parts by weight per 100 parts by weight of a magnetic powder.

10. The magnetic recording medium as in claim 9, wherein the powder is present in an amount of from 0.5 to 15 parts by weight per 100 parts by weight of a magnetic powder.

11. The magnetic recording medium as in claim 1, wherein the magnetic powder is selected from the group consisting of $\gamma\text{-}Fe_2O_3$, chromium dioxide powders ($CrO_2$), Co-containing magnetic iron oxide powders having a specific surface area ($S_{BET}$) of not less than 28 m²/g, magnetic metal powders having specific surface area ($S_{BET}$) of not less than 20 m²/g, and hexagonal ferrite magnetic powders having a longer diameter of not less than 0.35 μm.

12. The magnetic recording medium as in claim 11, wherein the magnetic powder is magnetic metal powders having a specific surface area ($S_{BET}$) of not less than 20 m²/g and a saturation magnetization ($\sigma_s$) of not more than 140 emu/g.

13. The magnetic recording medium as in claim 12, wherein the magnetic metal powders have a saturation magnetization ($\sigma_s$) of not more than 130 emu/g.

14. The magnetic recording medium as in claim 1, wherein the powder is represented by the formula $(Ba_b Pb_b)TiO_{2+x}$ wherein $0 < b < 1$ and x is defined in claim 1.

15. The magnetic recording medium as in claim 1, wherein the powder is represented by the formula $Sr(Ti_c Zr_{1-c})O_{2+x}$ wherein $0 < c < 1$ and x is defined in claim 1.

16. The magnetic recording medium as in claim 1, wherein the powder is barium titanate powder.

* * * * *